(12) United States Patent
Abe et al.

(10) Patent No.: US 7,050,461 B2
(45) Date of Patent: May 23, 2006

(54) PACKET BUFFER EQUIPMENT

(75) Inventors: Hideo Abe, Yokohama (JP); Yoshio Tamura, Yokohama (JP); Yuichirou Chikamatsu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1140 days.

(21) Appl. No.: 09/815,493

(22) Filed: Mar. 22, 2001

(65) Prior Publication Data
US 2001/0014100 A1    Aug. 16, 2001

Related U.S. Application Data

(63) Continuation of application No. PCT/JP98/04477, filed on Oct. 5, 1998.

(51) Int. Cl.
*H04J 3/24* (2006.01)

(52) U.S. Cl. ...................................... 370/474; 370/412

(58) Field of Classification Search ............. 370/395.5, 370/395.52, 395.6, 466, 471
See application file for complete search history.

(56) References Cited

U.S. PATENT DOCUMENTS 5,359,600 A * 10/1994 Ueda et al. ................. 370/399
6,188,689 B1 * 2/2001 Katsube et al. ............. 370/389
6,249,528 B1 * 6/2001 Kothary ..................... 370/466
6,728,261 B1 * 4/2004 Sasson et al. ............... 370/466

FOREIGN PATENT DOCUMENTS

JP    10-257070    9/1998

OTHER PUBLICATIONS

Japanese Office Action dated Dec. 7, 2004.

* cited by examiner

*Primary Examiner*—Duc Ho
*Assistant Examiner*—Thien D. Tran
(74) *Attorney, Agent, or Firm*—Katten Muchin Rosenman LLP

(57) ABSTRACT

Packet buffer equipment in which a buffer and time for packet assembly is utilized for packet header analysis and addition processing to obtain increased efficiency. The equipment aims to receive virtual channel (VC)-multiplexed ATM cells to assemble into a packet on a VC basis maintaining each received cell, to output on a packet basis. As an embodiment, cells are assembled into a packet by storing cells from the top cell to the end cell into a packet buffer memory consisting of a plurality of cell buffers to store cells. Also, a sequence controller is provided for detecting the write completion of a new header cell, and for connecting a packet in packet-under-assembly queue constituted by under-assembly pointer into an output-wait queue.

6 Claims, 19 Drawing Sheets

Packet buffer 2

Buffer management memory 44

RH : Header cell of received packet
SH : Header cell added to transmission packet
by header analysis and generation portion Discard

US 7,050,461 B2

PACKET BUFFER EQUIPMENT

This application is a continuation of international application number PCT/JP98/04477, filed Oct. 5, 1998.

FIELD OF THE INVENTION

The present invention relates to packet buffer equipment. More particularly, packet buffer equipment for outputting a packet assembled from VC (virtual channel)-multiplexed cells on a VC basis while maintaining received cells in a system packetizing a plurality of ATM (asynchronous transfer mode) cells for transmission and reception.

BACKGROUND OF THE INVENTION

There is a system which transmits and receives packetized cells. An example is shown in FIG. 16. A similar system is disclosed in the official gazette of Japanese Unexamined Patent Publication No. Hei-9-34816. A LAN 100 accommodating users using IP protocol are connected to a IP network 200 with encapsulation equipment 201.

From a received IP packet, LAN 100 generates an ATM (asynchronous transfer mode) cell, to encapsulate by adding LLC (logical link control) and SNAP (subnetwork access point). Such method of transmission is called "IP over ATM".

In encapsulation equipment 201 in large-scale IP network 200, the aforementioned encapsulated IP packet is further encapsulated to a new capsule by adding an intranetwork header proper to the network for use only within the network. The intranetwork header is deleted at the time of transmission from IP network 200 to a user belonging to LAN 100 in encapsulation equipment 201.

In FIG. 17, there is shown an ATM cell format of AAL Type 5. (AAL: ATM adaptation layer; a layer in which the length of user application data from higher order layer is adjusted into integral multiples of an octet by padding or dividing.) An ATM cell consists of a 5-byte header and a 48-byte payload. The 5-byte header includes VCI (virtual channel identifier) and end cell indication flag PT0 of cells comprising a packet.

An IP packet is output from a user 102 using a cell format shown in FIG. 17. The IP packet consisting of ATM cells is encapsulated as shown in FIGS. 18A, 18B.

Namely, ATM cells are packetized so that the maximum frame length is 65,535 octets. A 'PAD' consisting of 1 to 47 bytes may be inserted so that the packet length becomes integral multiples of 48-byte. Further, an 8-byte trailer which includes user information, frame length and CRC (cyclic redundancy check) is added.

Each frame of the IP packet includes the above-mentioned 3-byte LLC and 5-byte SNAP as a result of encapsulation. In a concentrator 101 shown in FIG. 16, ATM cells encapsulated into an IP packet are multiplexed for a plurality of virtual channels (VC-multiplexed).

The VC-multiplexed ATM cells can be demultiplexed to separate a packet for respective VCs by referring VCI in ATM cell header and by detecting the last-cell flag PT0.

Encapsulation equipment 201 provides the following functions: terminating in AAL5 a packet cell received from user 102; identifying an outgoing route to overwrite a new VC; and adding an intranetwork header proper to IP network 200 to transmit to a connection server 202, as shown in FIG. 18B.

On the other hand, encapsulation equipment 201 provides functions of; terminating in AAL5 a packet received from connection server 202 in IP network 200; deleting the header proper to the network; and identifying a destination user 102 to overwrite a new VC to transmit to the destination user.

Here, there may be a case that packets to an identical user are simultaneously received from a plurality of routes in the large-scale IP network. In order to prevent packets from being mixed to produce packet loss, the cells are packetized before transmission to the user. Thus assigning an identical VC to packets from different routes to that destination can be avoided.

Note that in the case of a packet cell transmitted from a user to another user both accommodated in LAN 100, the above header proper to the network is neither added nor deleted.

In order to provide encapsulation equipment 201 with the aforementioned functions, it is necessary to provide a buffering function for packetizing and storing received data on a per cell basis.

In FIG. 19, there is shown an example of configuration block diagram of packet buffer equipment to realize above functions. According to packet buffer equipment shown in FIG. 19, a received packet is stored for saving in packet buffer memory 210. A header in the packet is read out and analyzed and a new header is added to transmit, using software or firmware.

Specifically, as shown in FIG. 19, a received packet is once stored in a packet buffer memory 210. The packet is then transferred through a DMA circuit 211 to packet buffer memory 210. Predetermined read-out and analysis of the packet header is performed in a CLAD (cell assembly & disassembly) 212. Then a header proper to the network is generated and added for encapsulation, and the packet is transmitted.

The execution of the above-mentioned process in CLAD 212 is controlled by a microprocessor 214 according to the firmware 213, or software, for header analysis and generation.

Here, at the time of executing the process in CLAD 212 by the firmware 213 or software controlled by a microprocessor 214, reduction of processing time is substantially difficult. This may produce such a bottleneck that the header addition process affects the limitation to line accommodation capability especially when high-speed multiplexing lines are used.

Therefore, in recent years, as transmission lines become higher in speed and larger equipment in capacity is required, it is needed to perform packet header analysis and generation with higher speed using hardware. In this case, however, it is required to perform packet header analysis and addition processing within a predetermined period, so that header analysis and addition processing may catch up with the packet flow.

When the time required for packet processing is not constant, it is necessary to prepare to buffer an appropriate amount of packets considering maximum processing delay.

SUMMARY OF THE INVENTION

It is therefore an object of the present invention to provide packet buffer equipment which enables to perform packet assembly function and packet header analysis and addition function concurrently.

It is another object of the present invention to provide packet buffer equipment for efficient use of buffers used for packet assembly as well as time required for packet assembly.

Packet buffer equipment to fulfil the aforementioned requirement aims to receive VC-multiplexed ATM cells to assemble into a packet on VC basis while maintaining the received cells, and to output on a per packet basis.

According to the present invention, packet buffer equipment includes; a packet buffer memory having a plurality of cell buffers for storing received packets on a per cell basis; a buffer management memory for retaining buffer management information corresponding to the cell buffer in the packet buffer memory; a packet-under-assembly pointer corresponding to each VC to form a queue in the middle of storing packets from the top cell until the end cell into the packet buffer memory; and a header analysis and generation means for generating a new header cell by analyzing the top cell. The above-mentioned header analysis and generation means writes a newly generated header cell as a top cell of a packet-under-assembly queue.

One aspect of the invention is that the packet buffer equipment includes a sequence controller for controlling to complete the packet assembly by storing cells of a packet from the top cell to the end cell into the packet buffer memory, to detect the completion of writing the new header cell, and to connect the packet-under-assembly queue formed by the packet-under-assembly pointer to output-wait queue.

Another aspect of the invention is that the aforementioned writing of the new header cell as a top cell includes addition of the header cell, substitution of the header cell, or non-conversion processing of the top cell.

Still another aspect of the invention is that, on receipt of the top cell of the packet, two cell buffers linked each other corresponding to the top cell are reserved in the packet buffer memory, to start storing a cell of a received packet into the second cell buffer out of the reserved two cell buffers.

Still further, another aspect of the invention is that the header analysis and generation means controls to output information which indicates the completion of writing the generated new header cell as the top cell of the packet-under-assembly queue, as well as an attached information. Also, the sequence controller refers to the above-mentioned attached information to discard a packet-under-assembly queue formed by the under-assembly pointer instead of connecting to the output-wait queue, when discard is ordered in the attached information.

In addition, the contents of the new header cell are copied to the succeeding cell headers to output.

Further issues and features of the present invention will become more apparent by the following description of the embodiments referring to the accompanied charts and drawings.

DETAILED DESCRIPTION OF THE PREFERRED EMBODIMENTS

The preferred embodiments of the present invention are described hereinafter referring to the charts and drawings, wherein like numerals or symbols refer to like parts.

Figure 1:
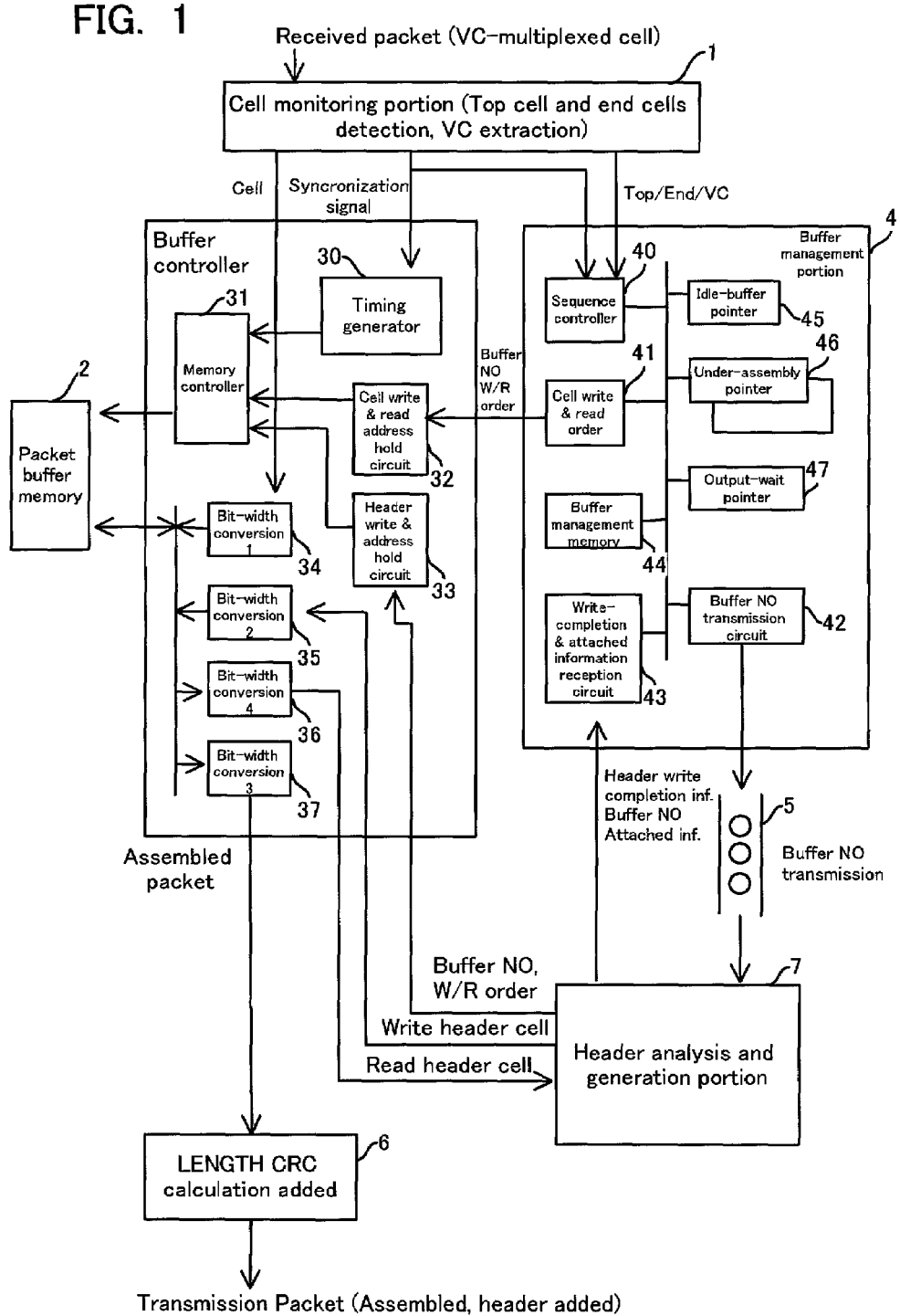
FIG. 1 shows a configuration example of the packet buffer equipment according to the present invention.
Figure 16:
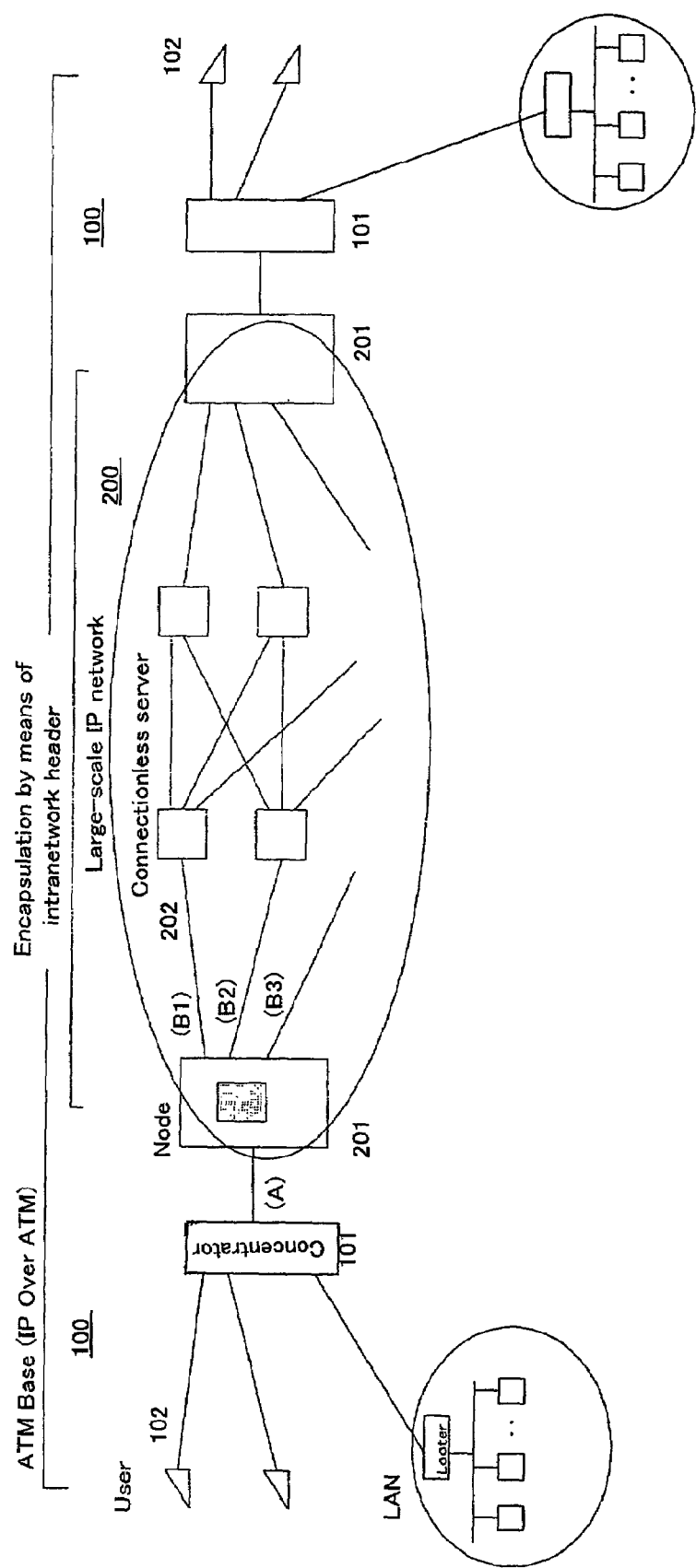
FIG. 16 shows a diagram illustrating an example of a system which packetizes cells for transmission and reception.
Figure 17:
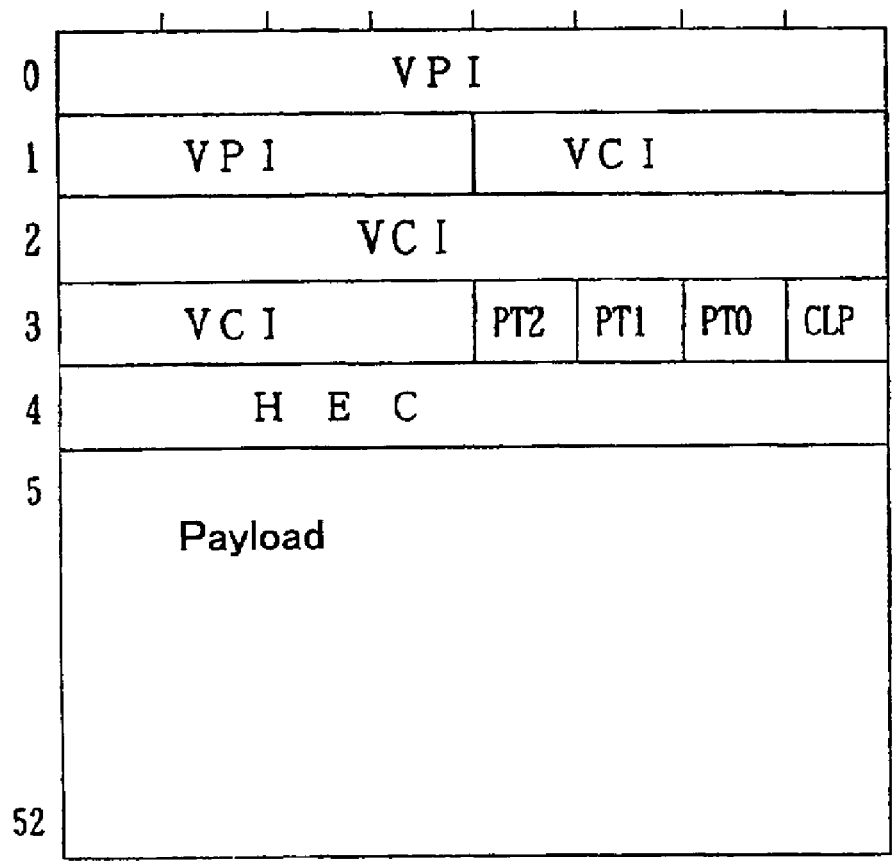
FIG. 17 shows the AAL5 ATM cell format.
Figure 18A:
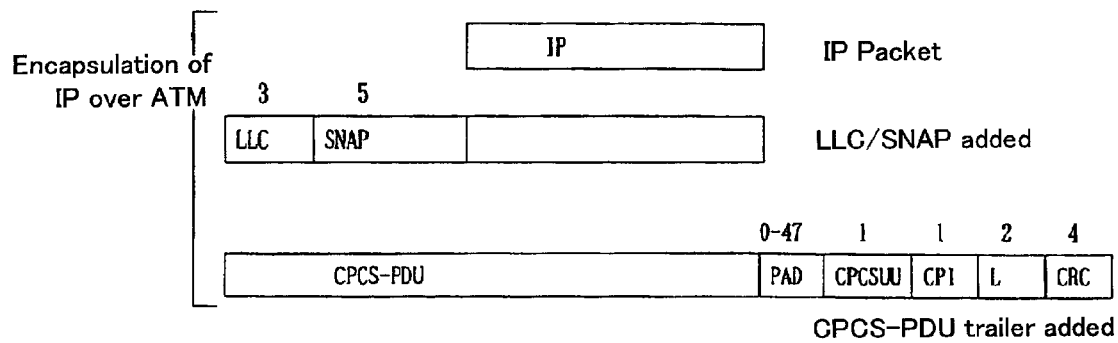
FIGS. 18A, 18B show diagrams illustrating IP over ATM and encapsulation by means of an intranetwork header.
Figure 18B:
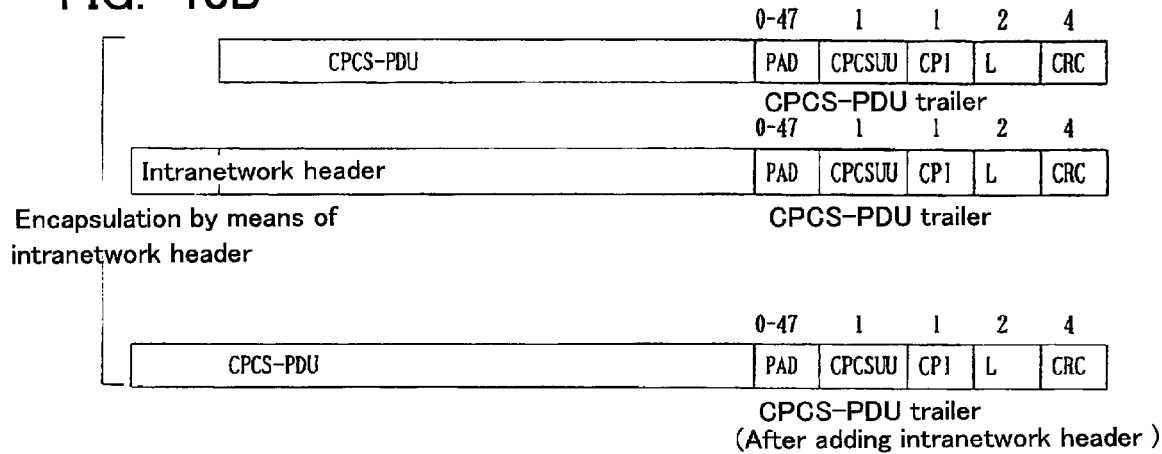
Figure 19:
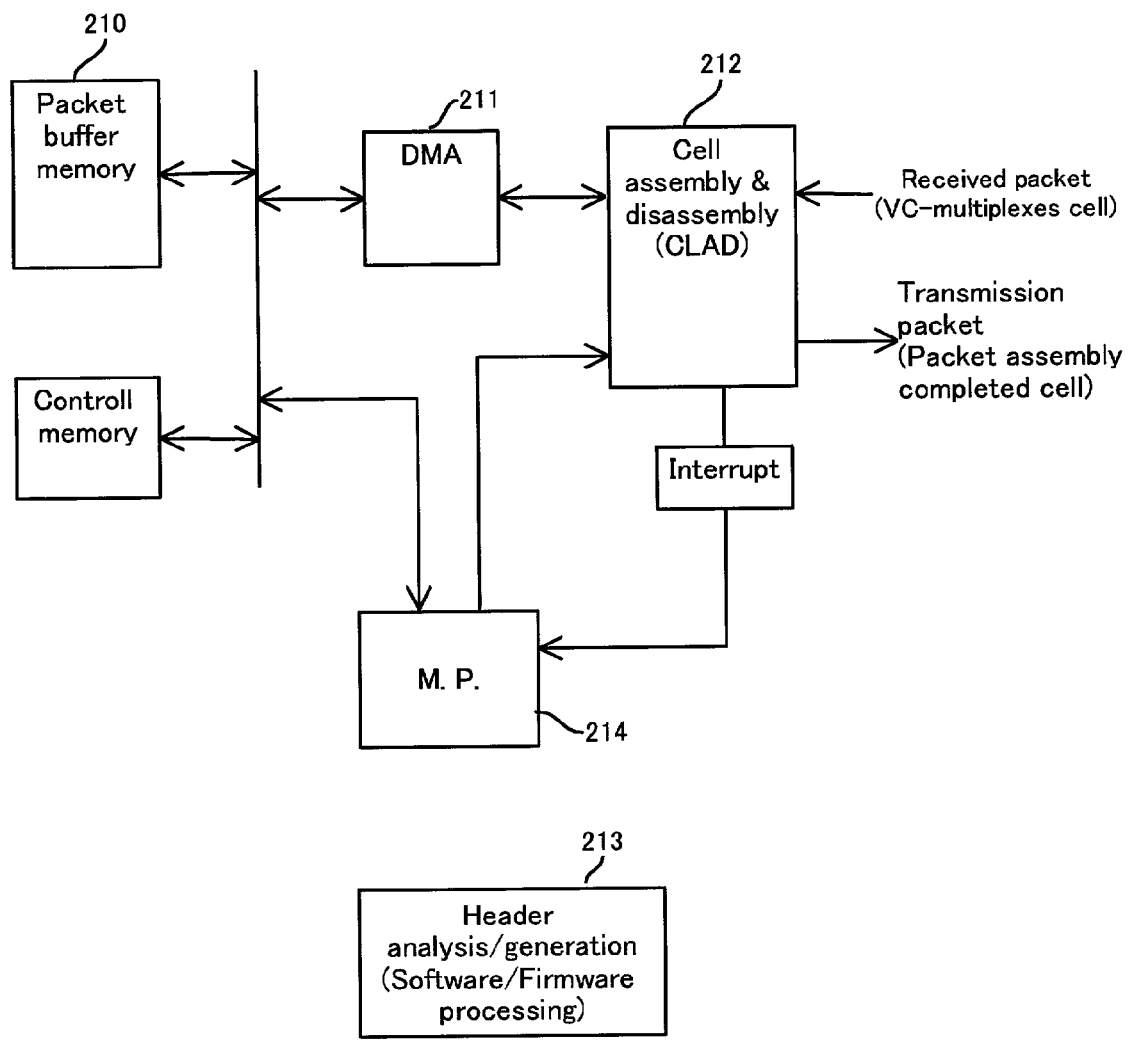
FIG. 19 shows a diagram illustrating conventional packet bur equipment.

In FIG. 1, there is shown a configuration example of packet buffer equipment in accordance with the present invention. The packet buffer equipment provides functions of receiving a VC-multiplexed cell transmitted from a user in a LAN 100 (refer to FIG. 16) to reconstruct on VC (virtual channel) basis to assemble into a packet.

Further, the packet buffer equipment has a function of adding a new header dedicated to an IP network 200 to encapsulate to output.

Oppositely, the packet buffer equipment has a function of deleting the header dedicated to the network from the encapsulated packet received from IP network 200 to forward to a user.

In FIG. 1, a cell monitoring portion 1 receives a VC-multiplexed IP packet from LAN 100, or receives a packet having intranetwork header from network 200.

In cell monitoring portion 1, information in both the top cell and the end cell is extracted from the received packet on VC (virtual channel) basis. The top cell and the end cell can be identified in the following manner: Each end cell of a packet is represented by the payload type (PT) PT0='1'. Therefore the top cell can be identified by searching a cell of the relevant VC which appears next to the end cell.

The cell having passed through cell monitoring portion 1 is input to buffer controller 3 together with a synchronization signal. Also, information on the extracted top cell and the end cell as well as VC (virtual channel) information are input to buffer management portion 4 together with the synchronization signal. Packet buffer memory 2 is a memory for storing a packet on a per cell basis.

Buffer controller 3 controls to write a received packet into packet buffer memory 2 of the received packets on a per cell basis, and also controls to read a packet for transmission from packet buffer memory 2 on a per cell basis.

At this time, controller 31 in buffer controller 3 controls writing and reading out on a per cell basis according to a timing signal generated in timing generator 30, based on the synchronization signal.

Here, an address for writing or reading each cell is transmitted from buffer management portion 4. The address is maintained in an address hold circuit 32.

Similarly, memory controller 31 in buffer controller 3 controls to write into packet buffer memory 2 a header cell received from header analysis and generation portion 7, or to read out a header cell to forward to header analysis and generation portion 7.

An address for writing or reading is transmitted from header analysis and generation portion 7, and is maintained in another address hold circuit 33.

Here, in respect of buffer controller 3, cases are to be considered that writing a received cell and reading a cell for transmission occur substantially simultaneously, and that writing a header cell and reading a header cell occur substantially simultaneously.

Figure 2:
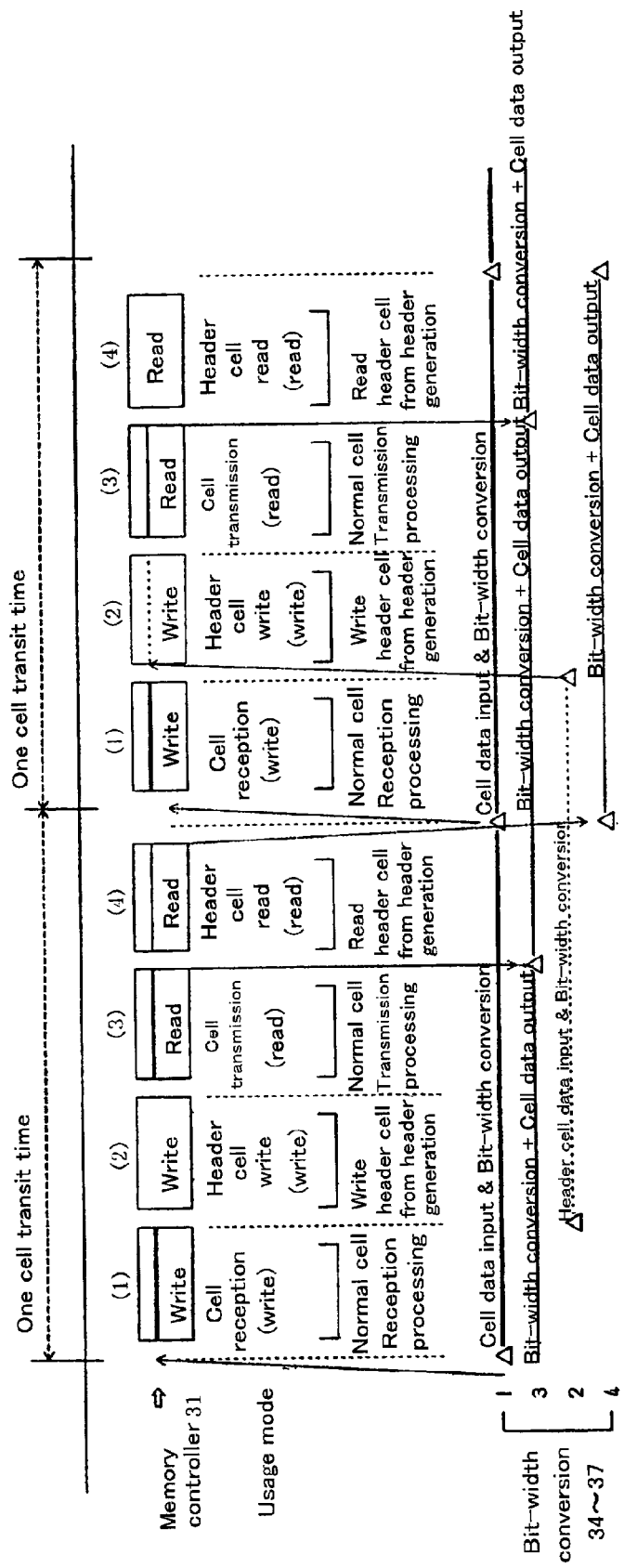
FIG. 2 shows a diagram illustrating the operation of buffer controller 3.

To address these cases, as shown in a time chart for cell writing and reading in FIG. 2 which illustrates an operation of buffer controller 3, buffer controller 3 performs the operation of writing the aforementioned received cell and the reading the cell for transmission in a cell time unit. Also the operation of writing a header cell and reading a header cell are carried out in a cell time unit. Thus the access time is guaranteed.

More specifically, the following operations are carried out within one cell transit time, as an example shown in FIG. 2: (1) writing a received cell into packet buffer memory 2, (2) writing a header cell, (3) reading the cell from packet buffer memory 2, and (4) reading the header cell.

In addition, as a feature of buffer controller 3 in FIG. 1, there is provided a first to a fourth bit-width conversion circuits 34 to 37, to convert between 8-bit and 64-bit (bidirectional) for each cell data transferred in 8-bit parallel.

Figure 3:
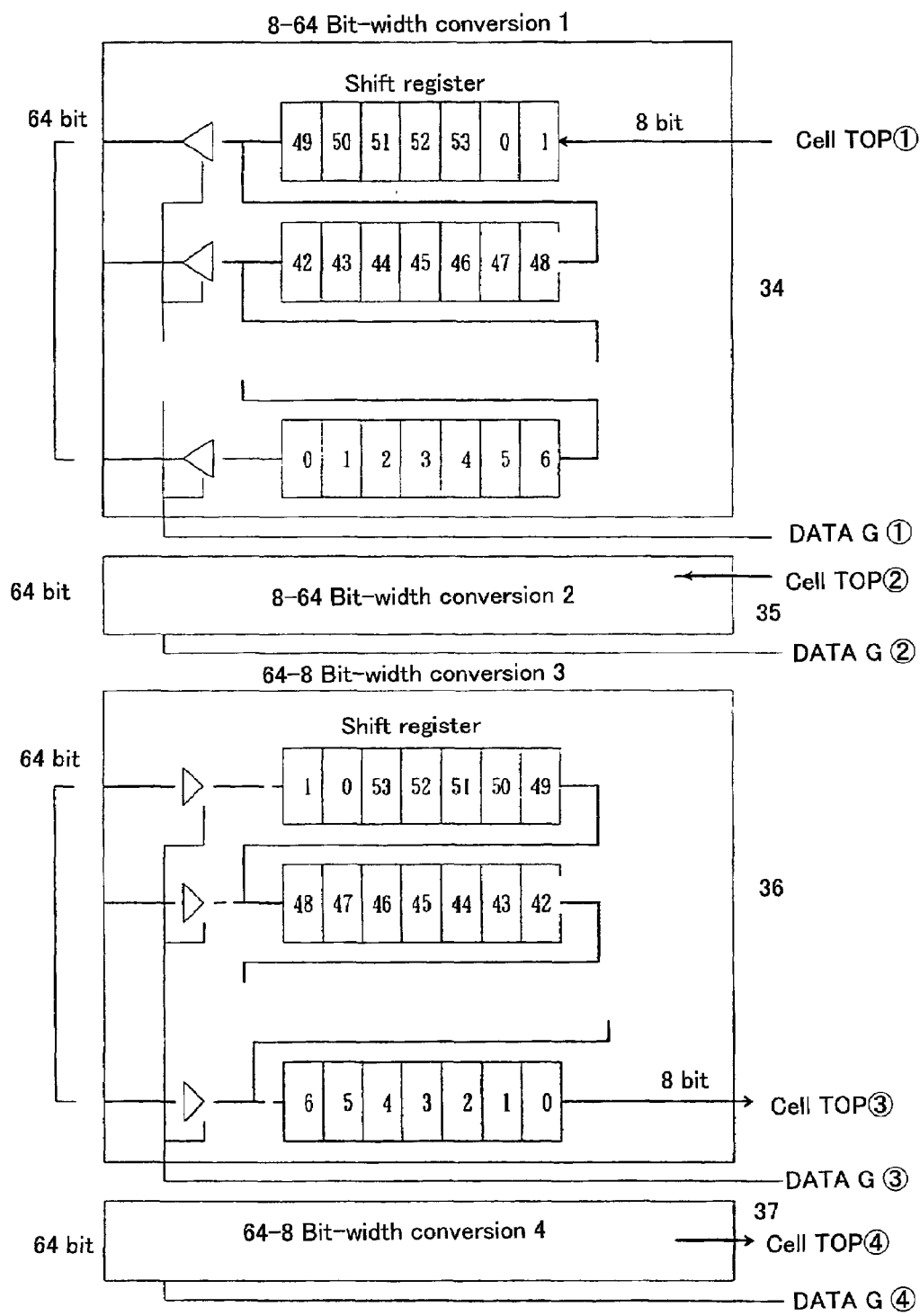
FIG. 3 shows an example of a block diagram of bit conversion circuit in buffer controller.

In FIG. 3, configuration examples of bit-width conversion circuits (between 8-bit and 64-bit) 34 to 37 are shown. Each circuit consists of eight (8) columns of shift registers composed of 8-bit-parallel data. Bit-width conversion circuits 34 and 35 respectively convert a 8-bit-parallel received cell input from cell monitoring portion 1 into 64-bit data; and a header cell having 8-bit parallel data received from header analysis and generation portion 7 into 64-bit data. The converted data are written into packet buffer memory 2.

Reversely, bit-width conversion circuits 36 and 37 respectively convert a 64-bit-parallel transmission cell read out from packet buffer memory 2 into 8-bit-parallel data; and a header cell into 8-bit-parallel data. Each converted data is forwarded to a trailer addition circuit 6, or header analysis and generation portion 7.

In the time chart shown in FIG. 2, bit-width conversion circuit (for conversion from 8-bit to 64-bit) 34 and 35 respectively perform conversion processing of 8-bit-parallel data cell and head cell into 64-bit-parallel data, as well as writing processing, in one cell transit time.

Similarly, bit-width conversion circuit (for conversion from 64-bit to 8-bit) 36 and 37 respectively perform reading operation of 64-bit-parallel data cell and head cell as well as converting the read data into 8-bit-parallel data, in one cell transit time.

As explained above, by performing writing and reading operation to and from packet buffer memory 2 with 64-bit-width, the number of accesses can be decreased. This situation is explained further referring to the time chart shown in FIG. 4, which corresponds to the circuit example shown in FIG. 3.

According to this circuit example, synchronous DRAMs are used in packet buffer memory 2. The following processing is carried out by seven (7) times of writing and reading operation per 64-bit, respectively: writing a received cell, reading a cell for transmission, writing a header for a cell, and reading a header for a cell.

Figure 4:
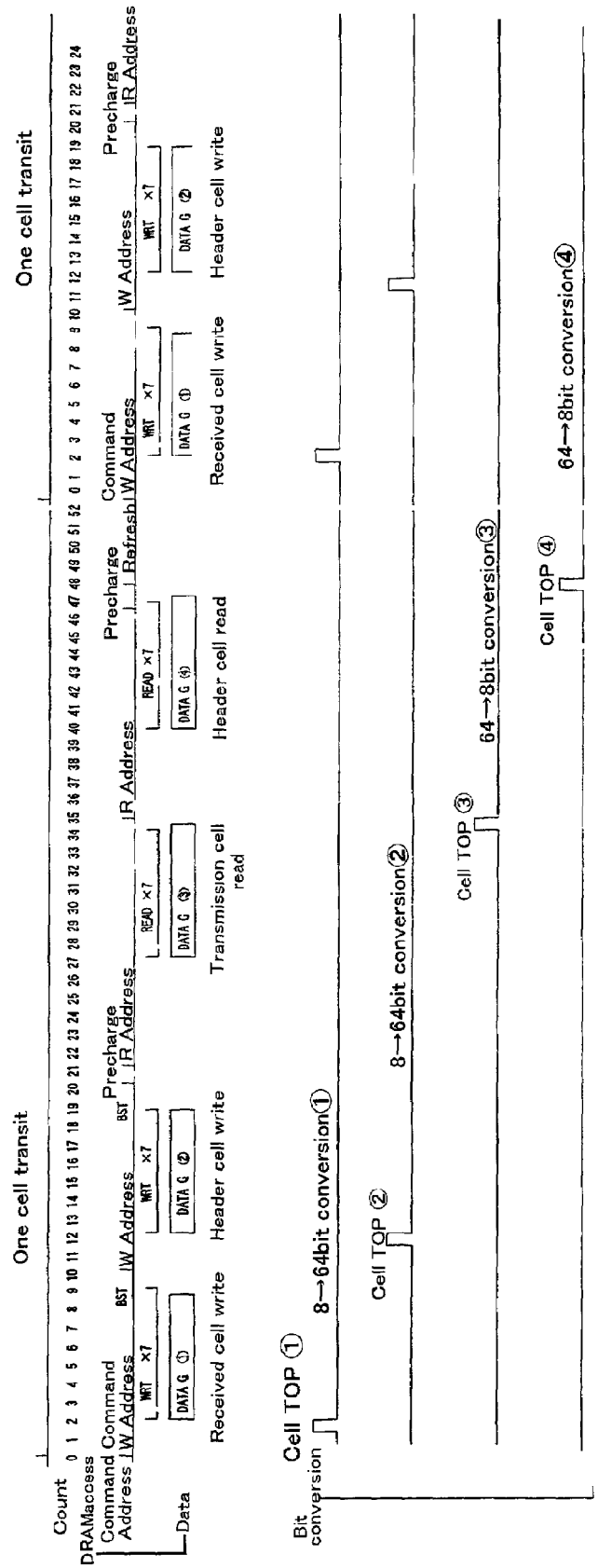
FIG. 4 shows a time chart corresponding to the circuit shown in FIG. 3.

Also, synchronization signals (cell TOPs) for respective cells may be shifted each other, as shown in FIG. 4. However, in case the phases of cell TOPs (1) to (4) are determined externally, the above can be realized by shifting phases properly inside bit conversion circuits 34 to 37.

In addition, even in case other than synchronous DRAM is used for packet buffer memory 2, the number of accesses can be reduced in a similar manner to the above-mentioned bit conversion and cell TOP adjustment methods.

As explained before, in FIG. 1, sequence controller 40 in buffer management portion 4 receives a top cell, an end cell and VC information of a packet of each VC (virtual channel) together with a synchronization signal from cell monitoring portion 1.

Buffer management portion stores into buffer 5 a buffer number for adding a header and a buffer number for reading a header each time the top cell of a packet is received. Here, FIFO (first-in, first-out) memory is used for buffer 5, and a queue is formed by successively writing buffer numbers of packet buffer memory 2 in which the top cells are stored.

Header analysis and generation portion 7 identifies that a buffer number is stored in buffer 5 then takes out the buffer number. In case the buffer number is for header reading, a request is issued to a header reading or writing address hold circuit 33 in buffer controller 3 to read out the header cell from the buffer number in packet buffer memory 2. Thus a header cell is read out under the control of memory controller 31 of buffer controller 3.

On the other hand, when a buffer number is the one requesting to produce a new header onto the received cell, header analysis and generation portion 7 adds a buffer number to write into packet buffer memory 2 through buffer controller 3.

Furthermore, header analysis and generation portion 7 writes a header into packet buffer memory 2, and at the same time sends a report of header write completion and attached information to a write completion & attached information reception circuit 43 in buffer management portion 4.

Figure 5:
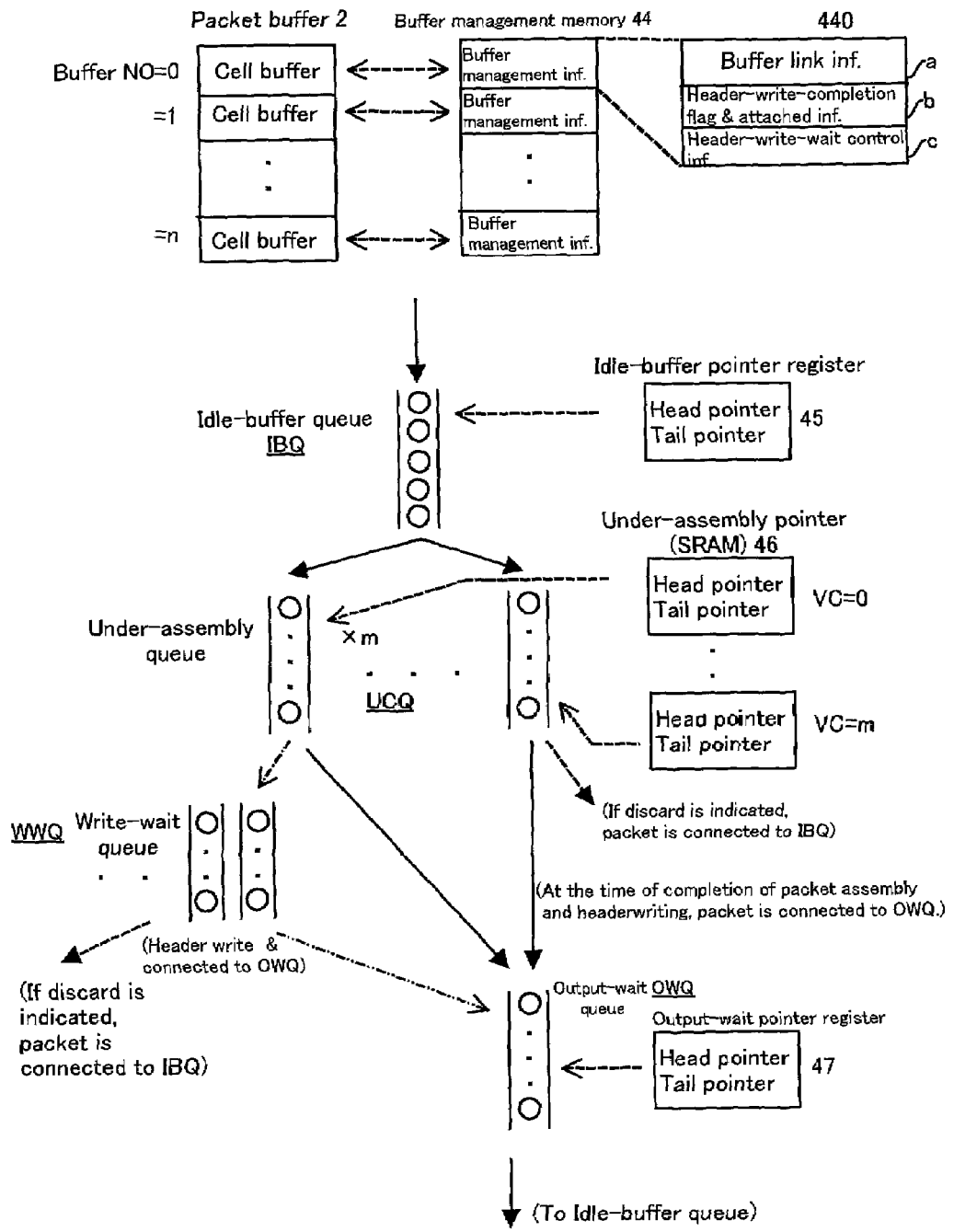
FIG. 5 shows a diagram illustrating the operation of a buffer management portion.

Now, the detail of buffer management portion 4 is explained hereafter referring to the operation flow shown in FIG. 5. A sequence controller 40 controls overall operation of buffer management portion 4. Sequence controller 40 sends to an address hold circuit 32 an empty buffer area address of packet buffer memory 2 for writing cell data through cell write & read order circuit 41, based on the information of both the top cell and the end cell on each VC (virtual circuit).

Accordingly, cell data is written into packet buffer memory 2 on a per cell basis under the control of memory controller 31.

Here, buffer management portion 4 includes a buffer management memory 44. Buffer management memory 44 further includes a plurality of management area for storing buffer management information having one-to-one correspondence to a buffer number (=1 to n) assigned to each cell buffer in packet buffer memory 2.

Buffer management information 440 stored in a buffer management area includes buffer link information 440*a*, header-write-completion flag & attached information 440b, and header-write-wait control information 440c, respectively corresponding to each cell.

Figure 6:
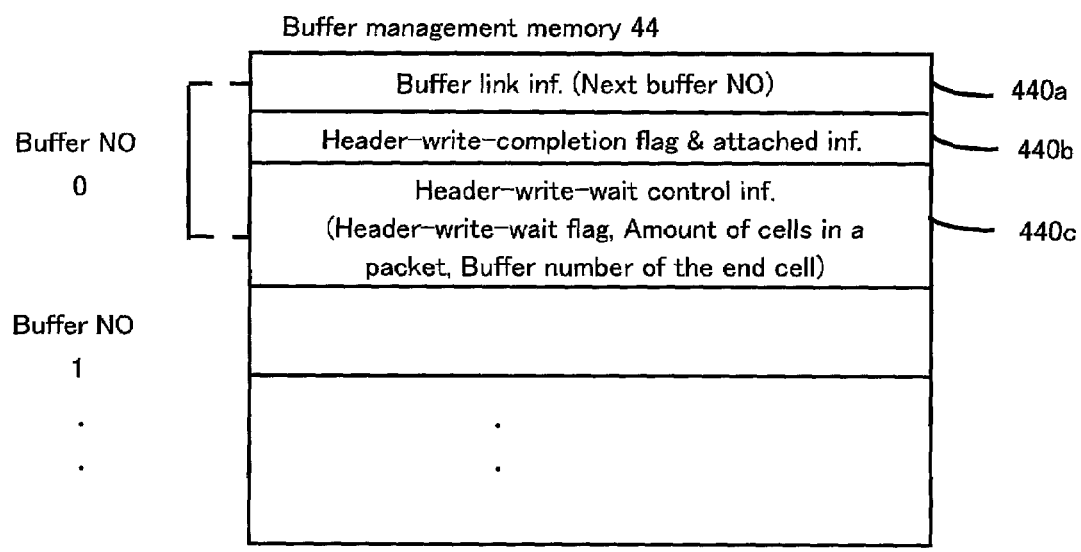
FIG. 6 shows a diagram illustrating contents of a buffer management memory.

The detail is shown in FIG. 6. In buffer link information 440a, the next buffer number of packet buffer memory 2 is recorded. This enables to link the top cell to the end cell of a received packet stored in packet buffer memory 2 on a per cell basis.

Figure 7A:
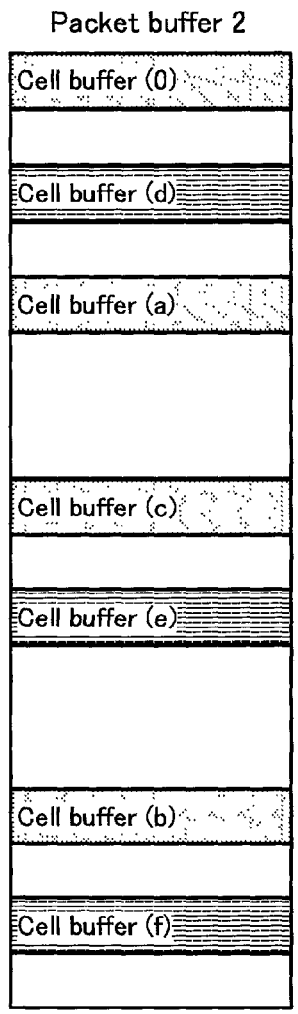
FIGS. 7A–7C show diagrams illustrating a link between buffers for buffer management.

Such link condition is shown in FIG. 7. FIG. 7A shows contents of packet buffer memory 2. Here, buffer numbers (0), (a), (b) and (c) are areas reserved for cells included in an IP packet, while buffer numbers (d), (e) and (f) are areas reserved for cells included in another IP packet.

Figure 7B:
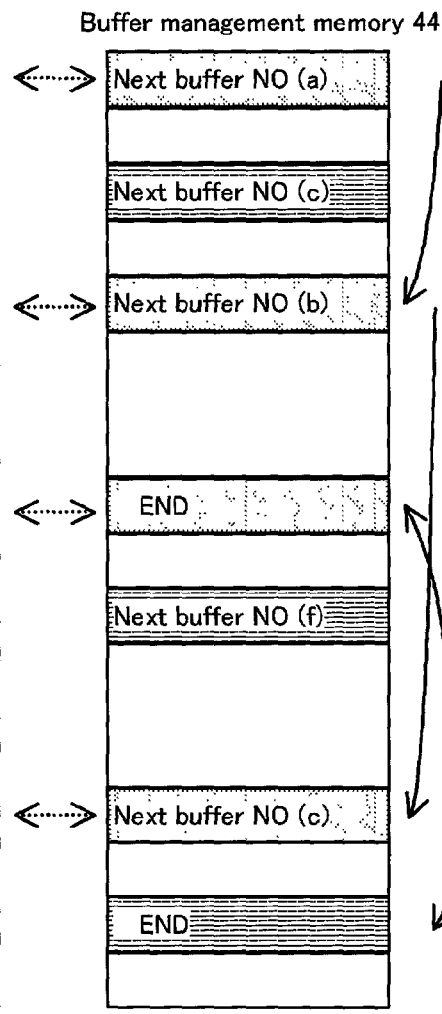

FIG. 7B shows the contents of buffer management memory 44 corresponding to each buffer memory 2. In an address location in buffer management memory 44 corresponding to the cell in packet buffer memory 2, there is recorded a link location (pointer) of buffer management memory 44 to which the next cell is stored.

For example, in buffer management memory 44, buffer number (a) which is linked next is recorded corresponding to the cell stored in buffer number (0) in packet buffer memory 2. Further, also in buffer management memory 44, buffer number (b) which is linked next is recorded corresponding to the cell stored in buffer number (a) in packet buffer memory 2.

Figure 7C:
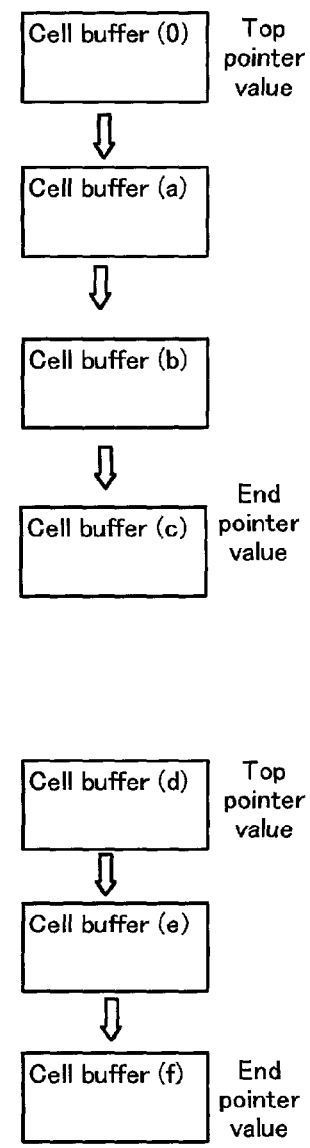

In such a manner, as shown in FIG. 7C, a link is configured for each packet from the top pointer value to the end pointer value (i.e. a link of buffer numbers (0), (a), (b), (c) and another link of buffer numbers (d), (e), (f)). This link enables to read out successively cells included in each packet in packet buffer memory 2.

Referring back to FIG. 5 and FIG. 6, as buffer management information stored in buffer management memory 44, header-write-wait control information 440c indicates the completion of packet assembly temporarily saved after the completion of packet assembly and the substitution of VC (virtual channel) during waiting for the header writing operation. This header-write-wait control information 440c includes header-write-completion flag & attached information 440b.

Here, as previously explained, the completion of packet assembly denotes a state that all cell data from the top cell to the end cell in a packet is stored into a packet buffer memory 2, and that the link is completed from the top cell to the end cell according to buffer link information in buffer management memory 44.

As explained later according to FIG. 8, a header-write-completion flag is set ON when a new top cell (i.e. header cell) to be added to a packet is stored into packet buffer memory 2 under the control of header analysis and generation portion 7.

Also, attached information includes header addition type and packet discard indication, which are stored when header writing is completed.

Further, as another buffer management information 440 stored in buffer management memory 44, there is provided header-write-wait control information 440c, which includes a header-write-wait flag, the amount of cells in a packet, and the buffer number of the end cell.

The header-write-wait flag is set ON when packet assembly is completed but the header writing is not completed yet. The end buffer number denotes the buffer number of the end cell of the assembled packet buffer link, as explained in FIG. 7C.

In FIG. 5, each cell buffer in packet buffer memory 2 configures either an idle-buffer queue IBQ, a packet-under-assembly queue UCQ, or an output-wait queue OWQ, depending on cell use conditions.

The conditions of each queue is controlled by an idle-buffer pointer 45, an under-assembly pointer 46, or an output-wait pointer 47 in buffer management portion 4, respectively. Between each pointer, a link is formed to connect a head pointer with a tail pointer. The top buffer number and the end buffer number are stored in these pointers which are updated each time when any cell buffer is transferred between the queues. Here, because the packet-under-assembly queue is necessary for each VC, a large number of under-assembly pointers corresponding to the number of VCs are required as the number of VCs increases. For this reason, it is desirable to use static RAM to configure under-assembly pointer 46. On the contrary, idle-buffer pointer 45 and output-wait pointer 47 respectively forms a single queue, making it possible to configure with a simple register therefor.

On completion of packet assembly, that is, on completion of writing cells from the top cell to the end cell in the packet into packet buffer memory 2, header-write-completion flag is set ON in a buffer management information area 440b in buffer management memory 44, if a new header has been written by header analysis and generation portion 7. By referring to the header-write-completion flag, sequence controller 40 checks whether the header writing has already been completed.

Only in case the header writing has been completed, sequence controller 40 connects an assembly-completed packet (i.e. cells in packet-under-assembly queue UCQ) to output-wait queue OWQ, and releases the packet-under-assembly queue UCQ. This is enabled by updating output-wait pointer 47 of output-wait queue OWQ, as well as under-assembly pointer 46.

In the case that the packet assembly is completed but the header writing is not completed, a header-write-wait flag is set ON. This flag is located in header-write-wait control information 440c of buffer management memory 44, corresponding to the buffer number of the top cell in the assembly-completed packet.

Further, the end cell buffer number and the number of cells in the packet are stored in header-write-wait control information 440c. Thus the packet is saved as header-write-wait queue WWQ. Accordingly, packet-under-assembly queue UCQ is released for the use of succeeding packets.

Also, at the time the header writing completion is indicated from header analysis and generation portion 7 to reception circuit 43, a header addition type and a packet discard indication are written, as attached information, in buffer management information area 440b of buffer management memory 44 shown in FIG. 6.

Therefore, when sequence controller 40 refers to buffer management information area 440b to identify the completion of packet assembly as well as the completion of header writing, and if packet discard indication in attached information is set ON, then the packet is discarded, instead of being connected to output-wait queue OWQ, and the buffer having been in use is connected idle-buffer queue IBQ.

Here, the case that the packet discard indication is set includes such that an address to be forwarded cannot be recognized properly.

Figure 8:
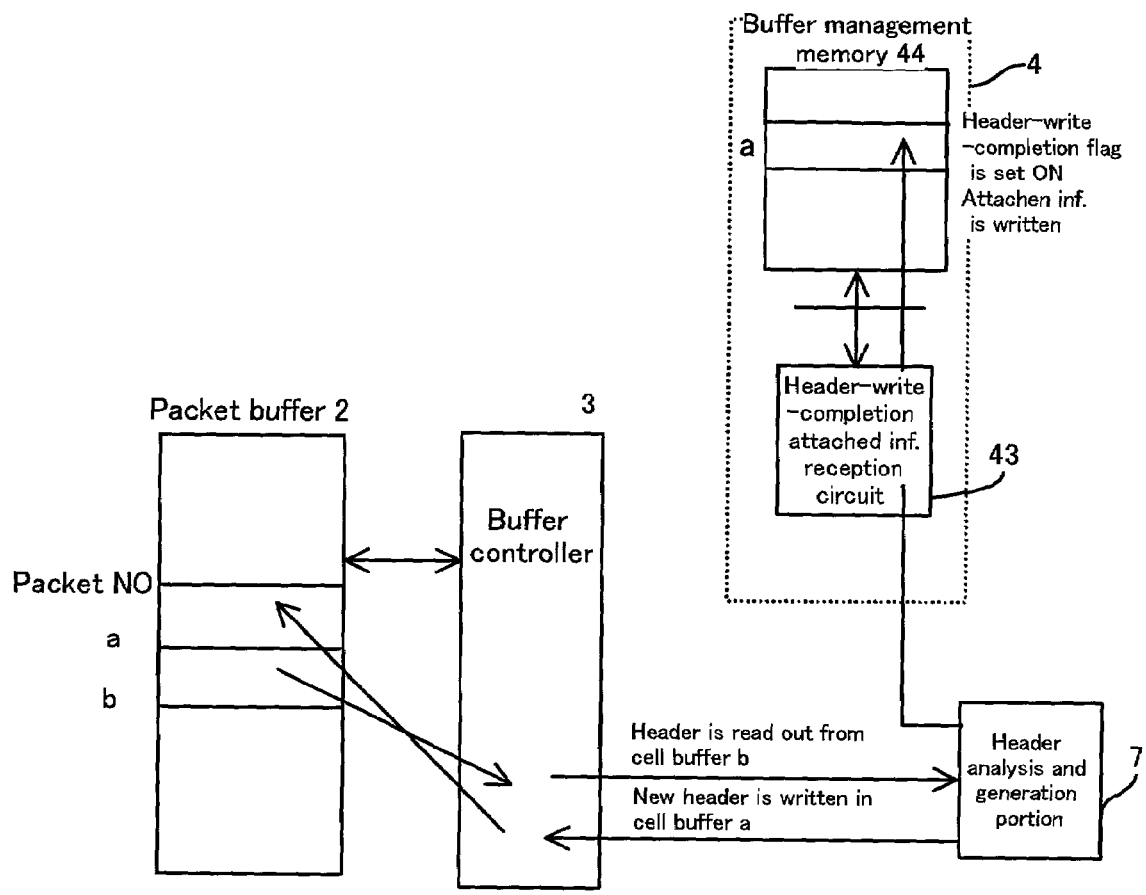
FIG. 8 shows a diagram illustrating the header write completion indication.

In FIG. 8, a schematic process diagram of indicating header writing completion mentioned above. In header analysis and generation portion 7, a header is read out to analyze from cell buffer No. b in packet buffer memory 2, through buffer controller 3. If the packet is destined for IP network 200, a new header for transmitting to IP network 200 is written in cell buffer No. a.

Further, header analysis and generation portion 7 sets to ON a header-write-completion flag located in buffer management information area 440b of buffer management memory 44, through header write-completion & attached information reception circuit 43 in buffer management portion 4, and at the same time an attached information is written.

Buffer management information area 440b set in such a manner is referred, on completion of packet assembly and header writing. If the discard is not indicated therein, the packet is connected to output-wait queue OWQ to transmit.

Figure 9A:
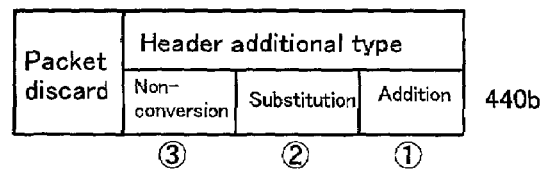
FIGS. 9A, 9B show diagrams illustrating the attached information of header write completion.

Here, in cell transmission processing, sequence controller 40 monitors the top of the packet and reads out the header addition type in attached information shown in FIG. 6 at the time of transmitting the top cell. Additional information at the time of header writing completion includes a packet discard indication and a header addition type, as shown in FIG. 9A.

The following are indicated by the header addition type: The header written by header analysis and generation portion 7 is either to be added onto the received header to forward (type: Addition. Refer to ① in FIG. 9(B)); to be substituted for the received header to forward (type: Substitution. ② in FIG. 9B); or the received header is forwarded as it is (type: Non-conversion. ③ in FIG. 9B).

Figure 9B:
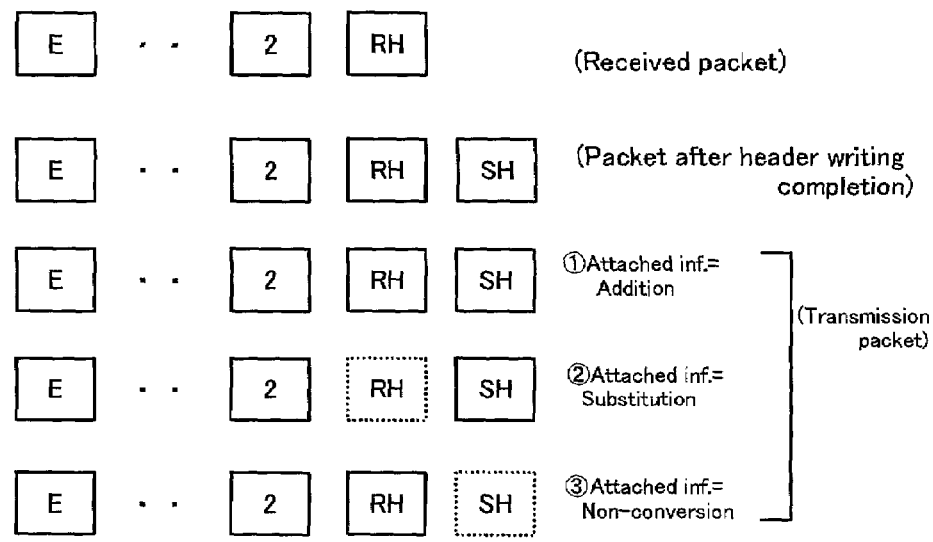
Figure 9B:

In FIG. 9B, RH denotes a header cell of the received packet, SH denotes a header cell added to the transmission packet by header analysis and generation portion 7. Also, E denotes the end cell of the packet.

Here, as shown in FIG. 9B, there is a case that a packet for transmission has both the received packet header cell RH and the added header cell SH, against a received packet (① in FIG. 9B).

To cope with this case, on receiving the top cell of a packet, sequence controller 40 reserves two buffer areas linked for writing the top cell (header cell) in packet buffer memory 2. On receiving a packet, the packet is stored from the second buffer area.

As previously illustrated in FIG. 8, header analysis and generation portion 7 reads the received header cell and generates a new header and adds cell buffer number to write into packet buffer memory 2 through buffer controller 3. Further, when writing the header, header analysis and generation portion 7 also forwards the header write completion information and attached information to the write-completion & attached information reception circuit 43 in buffer management portion 4.

Here, it is necessary to write the information VPI, VCI, PT and CLP (cell loss priority) in ATM cell header part in the cell newly added by header analysis and generation portion 7 into the succeeding cells in the identical packet.

For this purpose, as an embodiment example, the abovementioned information is copied to the succeeding cells when the cells are output from packet buffer memory 2. Thus the VC conversion can be carried out as well as new addition of the packet header.

Figure 10:
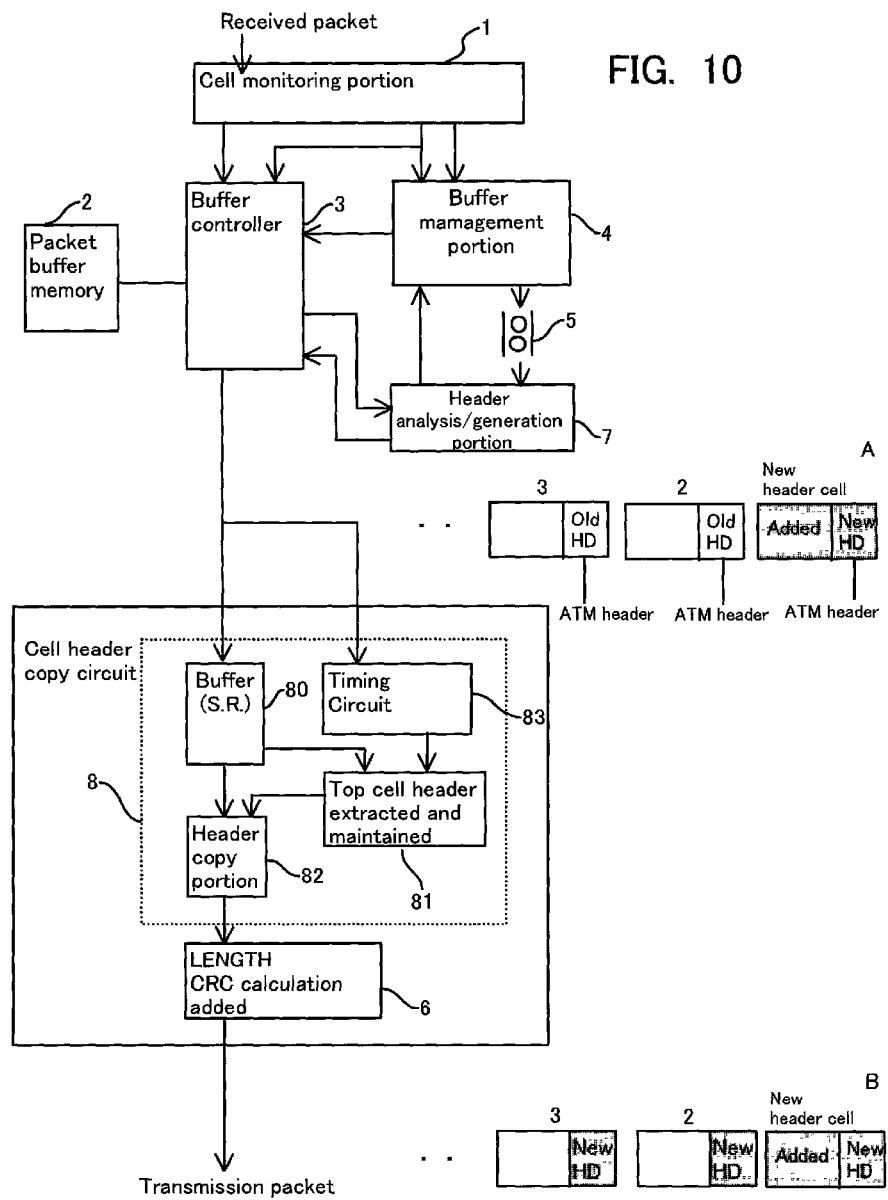
FIG. 10 shows an embodiment of a circuit for copying a header.

In FIG. 10, there is shown an embodiment of a circuit for conducting the aforementioned copying function. A series of ATM cells output from buffer controller 3 is shown as A in FIG. 10. A new header has been added in the top cell of the series of ATM cells. Original headers in the succeeding cells remain unchanged.

Now, a cell header copy circuit 8 is provided with buffer 80 and a circuit 81 for extracting and maintaining the top cell header. The top cell header extracted and maintained by circuit 81 is overwritten into the succeeding cell header, synchronously with a timing signal obtained from timing circuit 83.

Thus, copy circuit 8 enables to add the new top cell header to the succeeding cells to output, which is shown as B in FIG. 10. To remain necessary information unchanged, a copy area in the ATM header is predetermined.

The output from circuit 8 is further encapsulated with the addition of cell length and CRC calculation result, then to transmit.

Now, referring to operation flows shown in FIG. 11 to FIG. 15, operation examples of the aforementioned buffer management function are explained hereafter.

Figure 11:
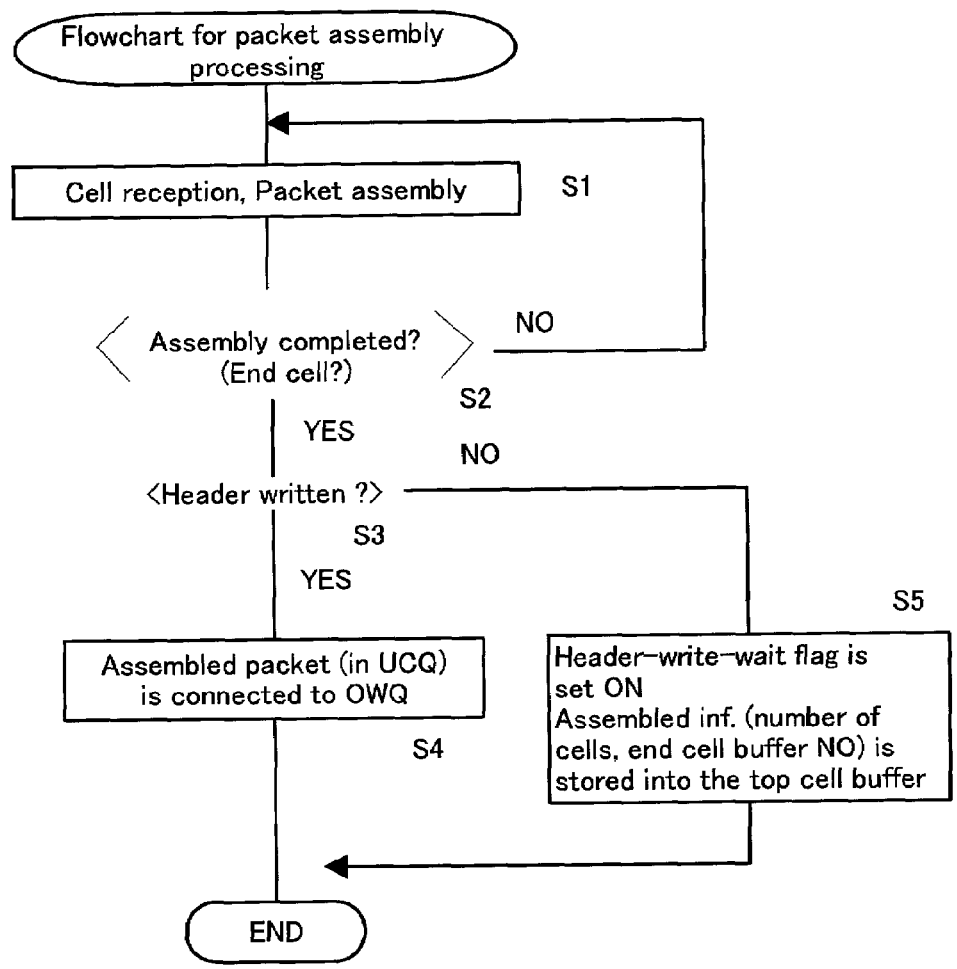
FIG. 11 shows a flowchart example of packet assembly processing in the buffer management portion.

In FIG. 11, there is shown a flowchart for packet assembly. Sequence controller 40 receives a cell to store to packet buffer memory 2 by tracing links from the top cell to the end cell of the packet for each VC. Thus packet assembly is carried out (step S1).

Then, it is checked whether the reception of the end cell and the packet assembly are completed (step S2). If the packet assembly has been completed, it is further checked whether a new header has been written (step S3).

If a header has been written, an assembled packet located in packet-under-assembly queue UCQ is connected to output-wait queue OWQ (step S4). On the contrary, when a header is not yet written, header-write-wait flag in area 440c of buffer management memory 44 is set ON. Then, the assembled information (i.e. number of cells, the end cell buffer number) is stored into buffer management memory 44 corresponding to the top cell buffer (step S5).

Figure 12:
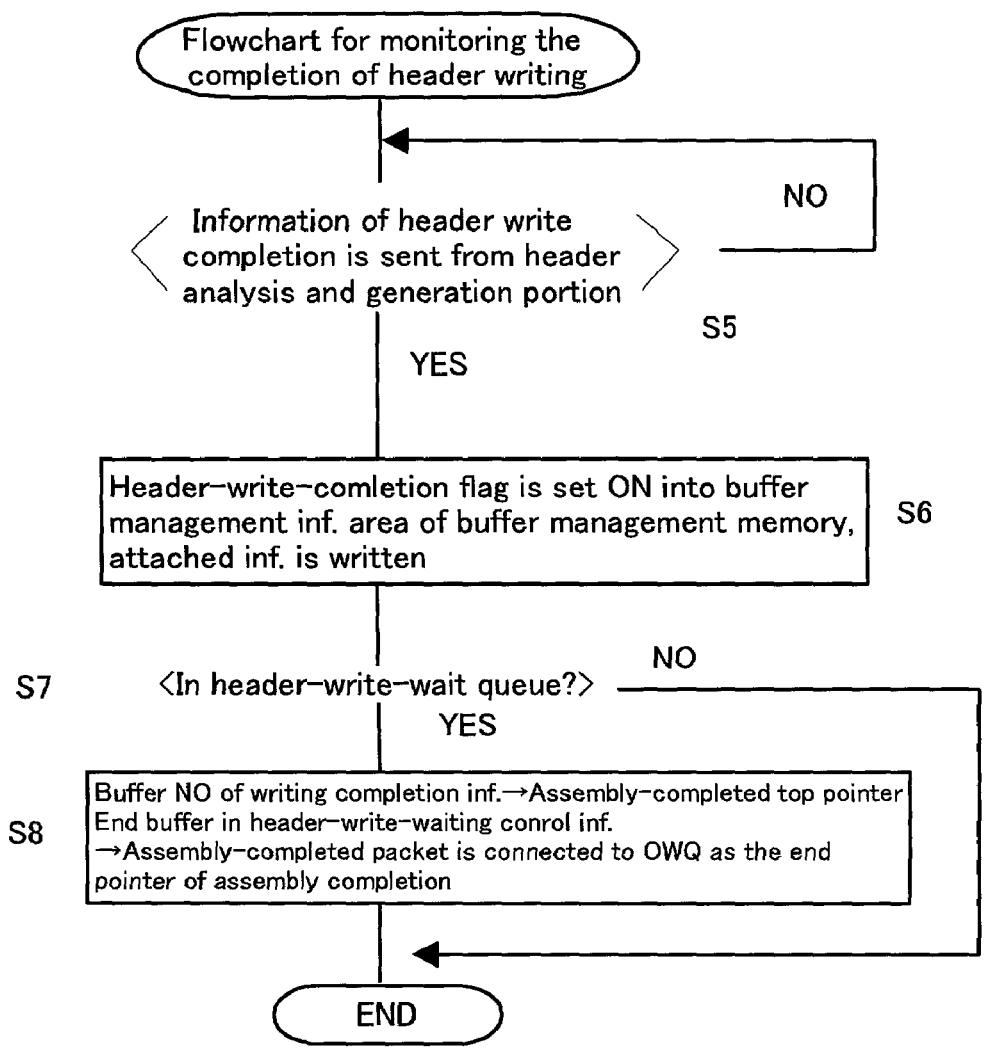
FIG. 12 shows a flowchart example of monitoring the header write completion in the buffer management portion.

In FIG. 12, there is shown a flowchart for monitoring the completion of header writing. Sequence controller 40 determines whether the information of header write completion is sent from header analysis and generation portion 7 to write-completion & attached information reception circuit 43 from header analysis and generation portion 7 (step S5).

If header write completion is already indicated, header-write-completion flag is set ON into buffer management information area 440c of buffer management memory 44, and attached information is written (step S6).

Next, whether the packet is in header-write-wait queue WWQ (step S7) is checked. If it is in header-write-wait queue WWQ, then the cell buffer number is set into the assembly-completed top pointer, and also the end buffer in header-write-waiting control information is set into an assembly-completed end pointer. Then the assembly-completed packet is connected to output-wait queue OWQ (step S8).

Figure 13:
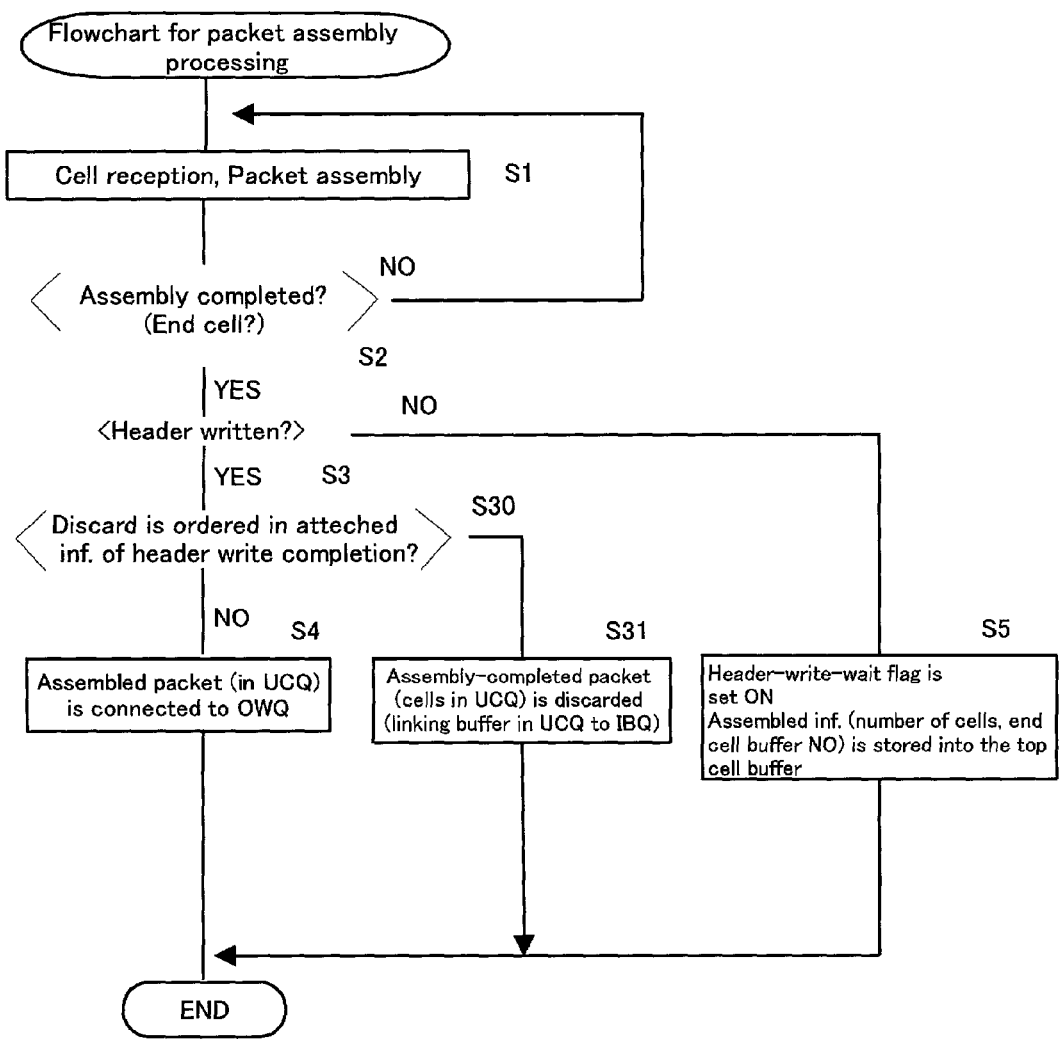
FIG. 13 shows another flowchart example of packet assembly processing in the buffer management portion.

In FIG. 13, there is shown another example of packet assembly flowchart corresponding to FIG. 11. When checking the completion of header writing in step S3, if the header has been written, additional decision is carried out whether discard is ordered in attached information of header write completion (step S30).

If discard is ordered, the assembly-completed packet in packet-under-assembly queue UCQ is discarded by linking cells in packet-under-assembly queue UCQ to idle-buffer queue IBQ (step S31).

Figure 14:
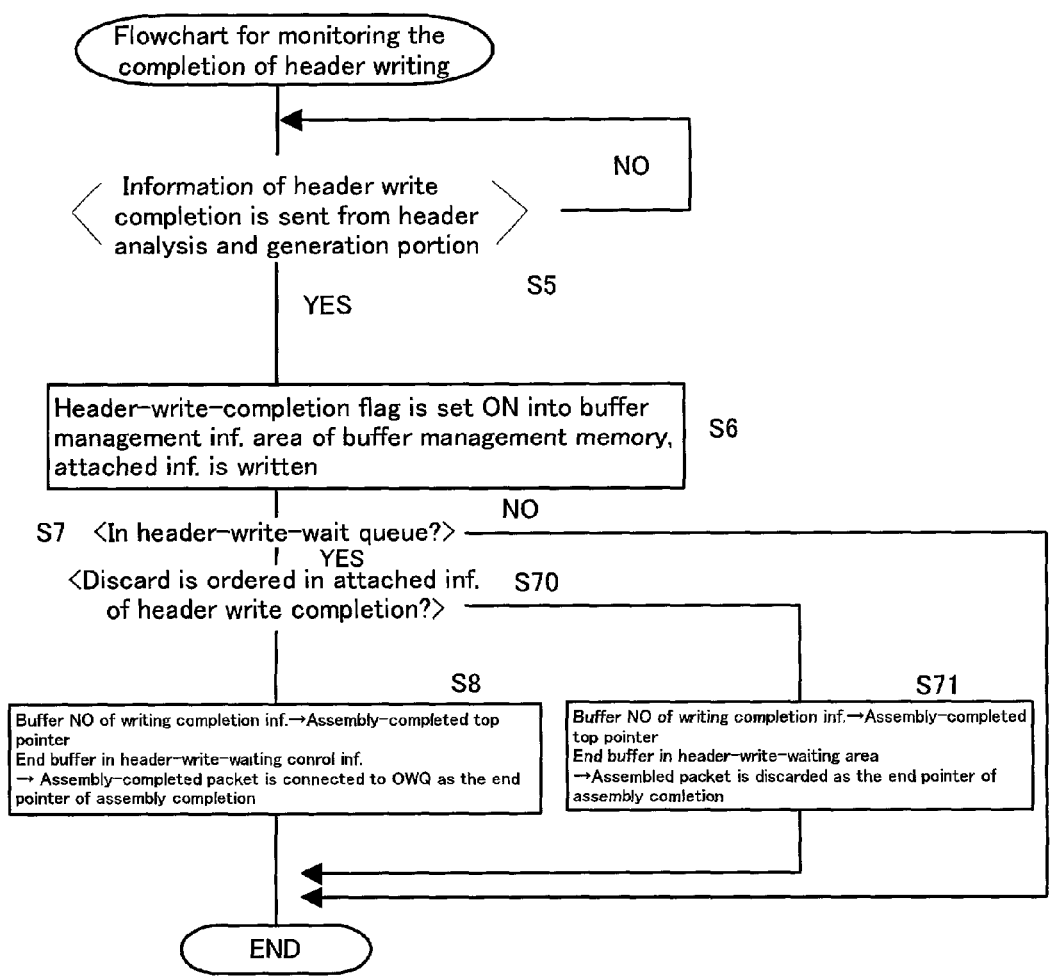
FIG. 14 shows another flowchart example of monitoring the header write completion in the buffer management portion.

In FIG. 14, there is shown another example of a flow to monitor completion of header writing corresponding to FIG. 12. When checking whether the writing is awaited (step S6), if writing is awaited, a decision is added whether the discard is ordered in attached information of header write completion, as shown in FIG. 13 (step S70).

When discard is ordered, the buffer number of writing completion information is set into the top pointer of assembling completion. Further, the end buffer in header-writewaiting area is set as the end pointer of assembly completion to discard the assembled packet.

Thus packet-under-assembly queue UCQ is linked to idle-buffer queue IBQ (step S71).

Figure 15:
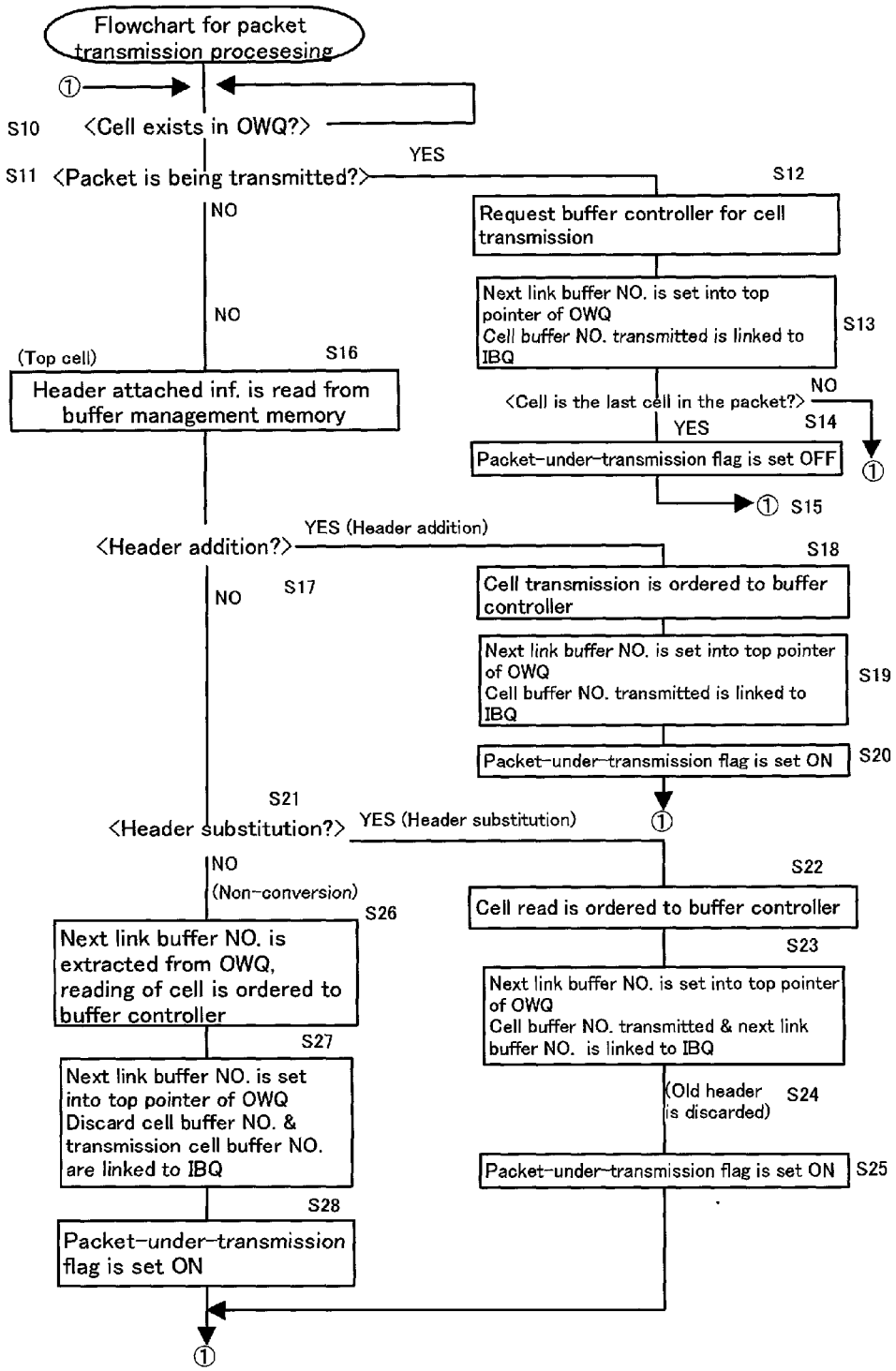
FIG. 15 shows an example of packet forwarding processing in the buffer management portion.

In FIG. 15, a flowchart for packet transmission processing is shown. Sequence controller 40 determines whether any cell exists in output-wait queue OWQ (step S10). When cell exists in output-wait queue OWQ, whether the packet is being transmitted is checked (step S11).

Here, the decision whether the packet is being transmitted is carried out based on the flag information provided in a non-illustrated register. The flag (packet-under-transmission flag) is kept ON when packet is being transmitted.

Using this flag information, when the packet is being transmitted, sequence controller 40 requests buffer controller 3 for cell transmission (step S12). Then, the next link buffer number is set into the top pointer of output-wait queue. Also, cell buffer number being transmitted is linked to idle-buffer queue IBQ (step S13).

Then, it is decided whether a cell is the last cell in the packet (step S14). If the cell is the last cell, the above-mentioned packet-under-transmission flag is set OFF (step S15).

On the other hand, in step S11, when the packet is not being transmitted, the top cell is read out and the header attached information is read from buffer management memory 44 (step S16). Then it is checked whether the packet is an object for the header addition processing (namely, whether the packet is destined for IP network 200) (step S17). When it is determined that the packet is an object for the header addition, the cell transmission is ordered to buffer controller 3 (step S18).

Then, the next linked buffer number is set into the top pointer of output-wait queue. Also, the buffer number of the cell being transmitted is linked to idle-buffer queue IBQ (step S19), and the packet-under-transmission flag is set ON (step S20).

In step S17, if the packet is not an object for header addition processing, it is checked further whether the packet is an object for header substitution (namely, whether or not the packet is destined for a user connected in LAN 100 from IP network 200) (step S21).

If the packet is the object for header substitution, then the cell transmission is ordered to buffer controller 3 (step S22). Then, the top pointer of output-wait queue is changed to the next linked buffer number but one. Also, the transmission cell buffer number and the next linked buffer number are linked to idle-buffer queue IBQ (step S23). Consequently the old header is discarded (step S24). Moreover, the packet-under-transmission flag is set ON (step S25).

Further, if the packet header is not an object for header substitution in step 21, then a buffer number is extracted from output-wait queue, and reading of cell is ordered to buffer controller 3 (step S26).

Then the top pointer of output-wait queue is changed to the next linked buffer number but one. Also, the discard cell buffer number and the transmission cell buffer number are linked to idle-buffer queue IBQ (step S27). Then packet-under-transmission flag is set ON (step S28).

INDUSTRIAL APPLICABILITY

Having been illustrated the embodiment according to accompanied charts and drawings, the present invention enables to perform header analysis and generation of a transmission header concurrently with packet assembly. Also, it is possible to perform reading a received header as well as adding a header for transmission, without affecting packet assembly processing.

Therefore, common buffers can be shared for packet assembly and for header processing, which results in effective reduction of hardware.

Also, the information exchange to and from the header analysis and generation portion can be performed with high speed. This high speed operation is guaranteed even in case high speed processing is required in the header analysis and generation. If congestion temporarily occurs in header analysis and generation, received packets can be retained in packet buffer memory. Therefore, header addition can effectively be conducted even in case required processing time for header analysis and generation varies depending on the packet types.

In addition, by means of header write indication means, it is also possible to discard packet or to transit packet (without modification). Header addition and packet processing can be ordered simultaneously using simple hardware.

As having been explained above, according to the present invention, it is possible to add or substitute packet header in high speed, using shared packet buffers used for receiving VC-multiplexed packets having ATM cells to transmit by packetizing cells in a received form. It is very effective in a system having high speed lines where packet header addition is required in high speed with reduced amount of hardware.

The foregoing description of the embodiments is not intended to limit the invention to the particular details of the examples illustrated. Any suitable modification and equivalents may be resorted to the scope of the invention. All features and advantages of the invention which fall within the scope of the invention are covered by the appended claims.

What is claimed is:

1. Packet buffer equipment for receiving virtual channel multiplexed ATM (asynchronous transfer mode) cells to assemble into a packet for each virtual channel without modifying the received cells and to output on a per packet basis, said packet buffer equipment comprising:
    a packet buffer memory having a plurality of cell buffers for storing a received packet on a per cell basis;
    a buffer management memory for retaining buffer management information corresponding to each cell buffer in said packet buffer memory;
    a packet-under-assembly pointer for constituting a packet-under-assembly queue to store cells into said packet buffer memory on the virtual channel basis to assemble from the top cell to the end cell; and
    a header analysis and generation means for analyzing said top cell to generate a new header cell, and for writing said generated new header cell as a new top cell in said packet-under-assembly queue.

2. The packet buffer equipment according to claim 1, further comprising:
    a sequence controller for detecting the completion of assembly into a packet from the top cell to the end cell, for detecting the completion of writing said new header cell, and for controlling to connect said packet from said packet-under-assembly queue constituted by said packet-under-assembly pointer to an output-wait queue.

3. The packet buffer equipment according to claim 1, wherein the write processing of said new header cell as the top cell includes either addition of said header cell, substitution of said header cell, or non-conversion processing of said top cell.

4. The packet buffer equipment according to claim 1,
wherein two linked cell buffers are seized from said packet buffer memory, on receiving the top cell of a packet, corresponding to said top cell to start storing cells of said packet being received from the second cell buffer out of said two cell buffers.

5. The packet buffer equipment according to claim 2,
wherein said header analysis and generation means outputs the write completion information of a generated new header cell as a top cell in said packet-under-assembly queue and attached information, and said sequence controller controls to discard a packet in packet-under-assembly queue constituted by said packet-under-assembly pointer, instead of connecting said packet into said output-wait queue, by referring to said attached information.

6. The packet buffer equipment according to claim 1,
wherein contents of said new head cell are copied to headers into succeeding cells to output.

* * * * *